May 21, 1929.   D. M. SOLENBERGER   1,713,785
DEVICE FOR REDUCING PISTON SLAP IN INTERNAL COMBUSTION ENGINES
Filed Oct. 1, 1928
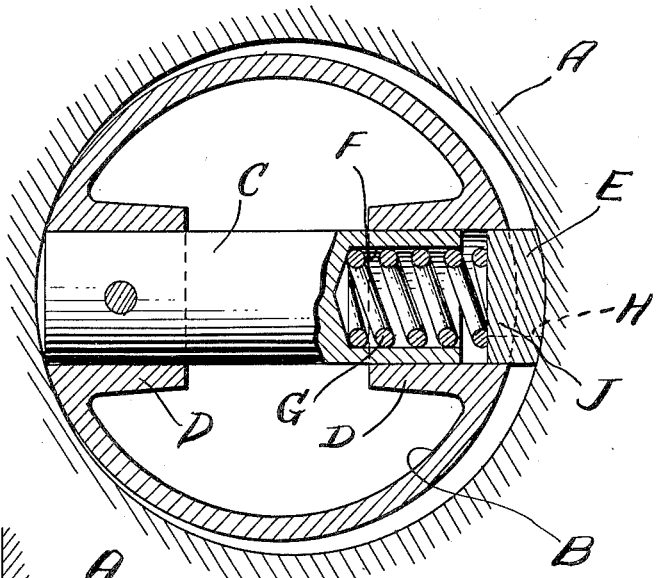
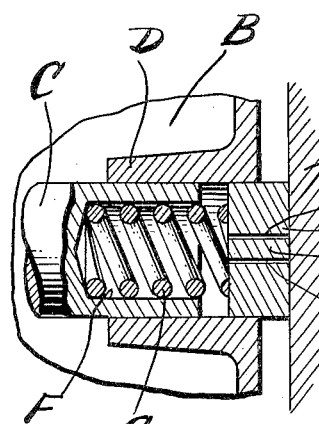
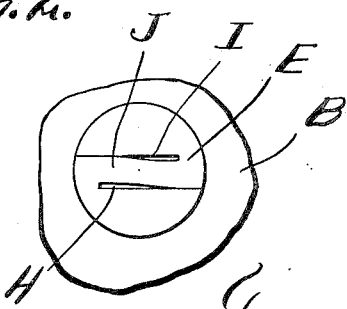
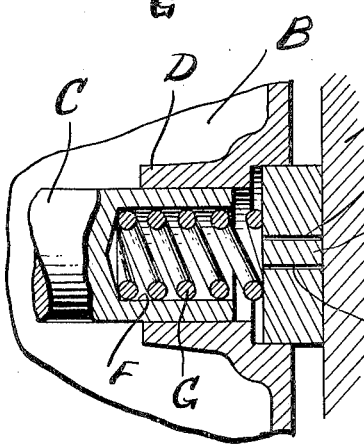
Inventor
Dean M. Solenberger
By Whittemore Hulbert
Whittemore Belknap
Attorneys Patented May 21, 1929.

1,713,785

UNITED STATES PATENT OFFICE.

DEAN M. SOLENBERGER, OF CLEVELAND, OHIO, ASSIGNOR TO THE SIMPLEX PISTON RING COMPANY OF AMERICA, INC., A CORPORATION OF OHIO.

DEVICE FOR REDUCING PISTON SLAP IN INTERNAL-COMBUSTION ENGINES.

Application filed October 1, 1928. Serial No. 309,633.

This invention relates to anti-slap devices for pistons of internal combustion engines and consists in the novel construction as hereinafter set forth.

In the drawings:

Figure 1 is a horizontal section through an engine cylinder and piston showing my improvement applied thereto.

Figure 2 is a vertical section of a portion of Figure 1.

Figure 3 is an elevation of the expansible shoe and

Figure 4 is a view similar to Figure 2 showing an enlarged shoe for engaging a corresponding recess in the piston.

In the construction of pistons for internal combustion engines it is usual to provide the same with bearing portions integral with the piston head and skirt in which the wrist pin is placed. With my improved construction I preferably make use of one of these bearings for holding a shoe which is resiliently pressed outward against the cylinder wall by a coil spring or other resilient means. Thus the body of the piston will be forced toward the diametrically opposite wall of the cylinder and will be held thereagainst by the tension of the spring so as to lessen or completely eliminate piston slap.

As the primary function of this device is to prevent noise, it is just as important to prevent slapping of the shoe within the bearing which contains it as it is to prevent slapping of the piston. This I have accomplished by providing a resiliently expansible shoe which is slightly compressed when inserted in the bearing and has sufficient resilient tension to maintain close contact with its bearing even at the highest speeds of operation.

As specifically shown, A is the cylinder, B a loose fitting piston therein which is shown with a greatly exaggerated clearance. C is the wrist pin and D are bearings integral with the piston in which the wrist pin is held. E is a shoe which is inserted into the outer portion of one of the bearings D and which is provided with a segmental outer surface for engaging with the wall of the cylinder. To permit the insertion of such shoe the wrist pin C terminates short of the outer end of the bearing and said pin is also recessed as indicated at F for the reception of a coil spring G which is of a predetermined tension and forces the shoe outward against the wall of the cylinder with a predetermined pressure.

With the construction as thus far described there would be danger that the shoe E might rattle within the bearing D during the rapid reciprocation of the piston. Such a result is avoided through the use of an expansible shoe preferably formed by transversely slotting the same to produce a resilient intermediate section. Thus as shown the shoe is slotted at H and I on opposite sides thereof so as to produce an intermediate flexible and resilient bar J. Before the shoe is fitted in the bearings D it is compressed so as to place the bar J under tension and therefore after insertion in the bearing the tension of the bar will maintain contact of the periphery of the shoe with the socket. The tension is sufficient to prevent any collapsing of the shoe due to its own inertia or from any other causes and at the same time is not great enough to prevent the outward movement of the shoe under the tension of the spring G.

In use when the parts are assembled and placed within the cylinder the shoe E will be forced outward against the cylinder wall and through its reaction will force the piston in the opposite direction or against the diametrically opposite cylinder wall. This will prevent the movement of the piston from one wall to the other and will consequently prevent piston slap.

While I preferably use a shoe which will fit within the bearing for the wrist pin, it is obvious that I may, if desired, use a larger shoe which will have a more extended bearing surface. Such a construction is shown in Figure 4.

What I claim as my invention is:

1. The combination with a cylinder and a loose fitting piston therein, of a shoe engaging a recess in said piston, resilient means for expanding said shoe to maintain close fitting contact with the walls of said recess and resilient means for pressing said shoe outward from its socket whereby it will react to hold said piston against the opposite wall of the cylinder.

2. The combination with a cylinder and a loose fitting piston therein provided with bearings for the wrist pin, of a shoe fitting within the end portion of one of said bearings and being resiliently expansible to maintain close fitting contact therewith, and a spring for forcing said shoe outward axially of the wrist pin to maintain said piston in contact with the opposite wall of the cylinder.

3. The combination with a cylinder and a loose fitting piston therein provided with bearings for a wrist pin, of a wrist pin in said bearings terminating short of the outer end of one of said bearings, a shoe located in the recess in said bearing at the end of said pin, said shoe being resiliently expansible to maintain close fitting contact with the recess, and a spring engaging a recess within said pin and bearing against said shoe to press the same outward whereby the reaction will hold said piston in contact with the opposite wall of the cylinder.

4. The combination with a cylinder and a loose fitting piston therein provided with bearings for a wrist pin, of a wrist pin in said bearings terminating short of the outer end of one of said bearings, a shoe fitting within said recess slotted and compressed to be resiliently expansible and to maintain close fitting contact with said recess, and a spring for forcing said shoe outward axially of the wrist pin to maintain said piston in contact with the opposite wall of the cylinder.

In testimony whereof I affix my signature.

DEAN M. SOLENBERGER.